June 16, 1953

J. E. WHITE 2,642,075

APPARATUS FOR RELAYING A CONTROL FUNCTION
THROUGH COMPRESSED AIR

Filed Aug. 15, 1949

INVENTOR.
JUD E. WHITE,
BY
James M. Abbett
ATTORNEY.

Patented June 16, 1953

2,642,075

UNITED STATES PATENT OFFICE 2,642,075

APPARATUS FOR RELAYING A CONTROL FUNCTION THROUGH COMPRESSED AIR

Jud E. White, Long Beach, Calif., assignor to Martin-Decker Corporation, Long Beach, Calif., a corporation of Delaware Application August 15, 1949, Serial No. 110,249

1 Claim. (Cl. 137—85)

This invention relates to a method of and apparatus for relaying a control function by compressed air and has particular utility in operating a graphic recorder in accurate response to successive positions assumed by a speed responsive element.

It is an object of this invention to provide such a method and apparatus which will supply ample power through compressed air for operating said recorder without impairing the accuracy with which said positions of said element vary in true proportion to fluctuations in said speed.

The transmission of power varying in proportion to the movement of an element is commonly effected by fluctuations in static pressure within a body of air from which air is discharged through a nozzle the tip of which is disposed close to said element so that the pressure of said air varies with the movement of said element to or from said nozzle. In order to operate a graphic recorder located at a point remote from a magnetic speed responsive element such as commonly employed in tachometers, I applied a cam to said element having a cam face opposite which said nozzle was positioned but discovered that very small inaccuracies in the machining of said cam face and the slightest looseness in the bearing for said element greatly impaired the serviceability of this arrangement.

It is another object of the present invention to provide a novel method of and apparatus for relaying a control function through compressed air by variations in spacing between a nozzle, through which said air is discharged, and an element disposed in obstructing relation with said nozzle, and in which the effects produced by imperfections in the machining and mounting of said element are minimized.

A further object of the invention is to provide a novel electro-pneumatic graphic recording tachometer utilizing the method and embodying the apparatus of the invention.

To avoid inaccuracies being introduced into the values recorded by the graphic recorder of a tachometer by flaws in the machining of the cam and by any slight looseness in the cam bearing, I have conceived the idea of determining the spacing of the nozzle from the cam by a variation in the air pressure in a bellows attached to the nozzle in such a way as to shift the nozzle to and from the cam as the pressure in the bellows fluctuates. The cam is fashioned with a uniform but exaggerated change in radius, and the air manifold supplying air to the nozzle is connected directly to the bellows. Thus as the radius of the portion of the cam directly opposite the nozzle increases with the turning of the cam, the space between the cam face and the nozzle is decreased thereby building up the air pressure in the manifold and the bellows. The nozzle is accordingly shifted away from the cam, by the expanding of the bellows, to offset the movement of the cam face toward the nozzle caused by the cam rotation. The cam rotates relatively slowly so that these reactions to the rotation of the cam occur with almost no lag and conclude with a net increase in pressure in the manifold due to the necessity of providing a higher pressure in the manifold in order for the bellows, connected with the latter, to be able to hold the nozzle out of contact with the cam. This means that the bellows will now permit the nozzle to be positioned closer to the cam, than before the cam rotation aforementioned, as said air pressure is an inverse function of the distance between the nozzle and the cam face.

When the cam rotates in a reverse direction to decrease the radius of the cam face portion at the nozzle, an opposite reaction occurs resulting in a net reduction in the air pressure in the manifold, and a corresponding net increase in the space between the nozzle and the cam, although the nozzle will of course be shifted toward the cam by the contraction of the bellows under decreased air pressure. The contracted bellows will respond to a lower air pressure to keep the nozzle out of contact with said cam portion of lesser radius and said lower air pressure will be produced with the nozzle farther from the cam face than it was previously when opposite a cam portion of larger radius.

The spring action of the bellows thus functions to vary the spacing of the nozzle from the cam face in inverse proportion to the variations in radius of the cam portions disposed successively opposite the nozzle. Since the air pressure in the manifold varies inversely with such spacing, the air pressure varies directly as the angular rotation of the cam and thus also directly with the speed of rotation of the member which speed it is desired to record. An air line from the manifold to the recording gauge transmits to the latter, through the fluctuating static air pressure, in said line, ample power to shift a stylus over a traveling record sheet of said gauge whereby an accurate continuous record of said rotational speed may be produced at a point remote from said rotating member.

The invention is illustrated by way of example in the accompanying drawings in which.

Figure 2:
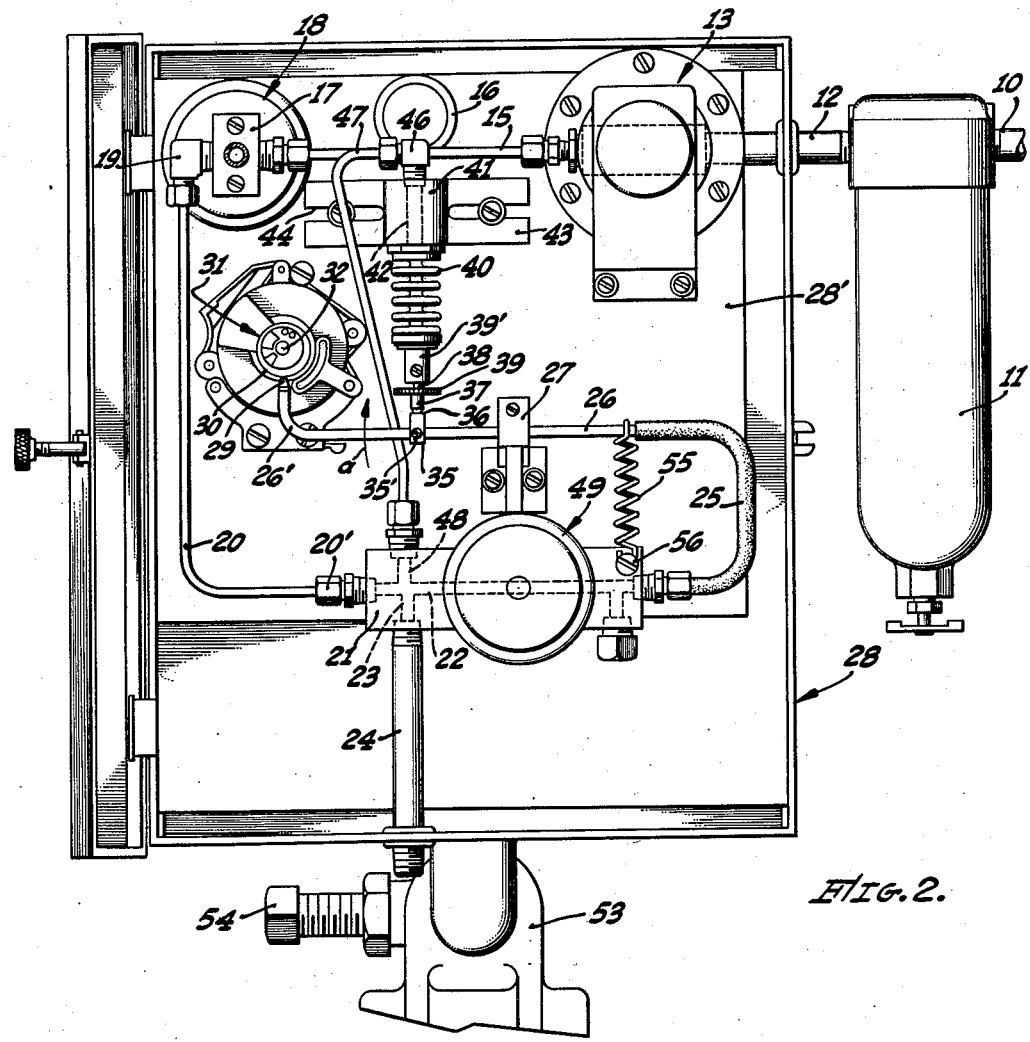
Fig. 2 is an enlarged front elevational view of the control box shown in Fig. 1 with the door thereof opened to display a preferred form of the apparatus of the invention contained therein.
Figure 1:
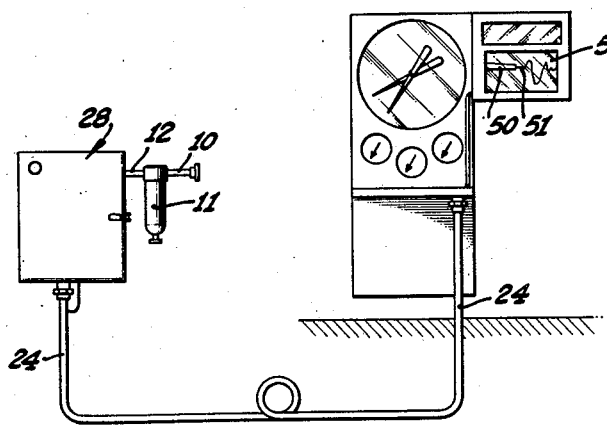
Fig. 1 is a diagrammatic view of an electro-pneumatic tachometer embodying the invention.

Referring more particularly to the drawing, 10 indicates a pneumatic supply pipe. This pipe is connected with a source of air under pressure not shown and leads to an air filter 11. The air filter 11 is provided with a connecting pipe 12 which communicates with a suitable reduction valve generally indicated at 13. The discharge of air from the valve is controlled and passes from the valve housing through a tube 15. In order to give flexibility to the tube and relieve the connections from undue strain the tube is looped, as indicated at 16. The opposite end of the tube is in communication with a connection block 17 to which a fluid pressure gauge 18 is connected. The block 17 is connected to an elbow 19 to which a tube 20 in the supply system is connected. The tube 20 is attached to a manifold block 21 by a coupling 20'. This coupling includes an orifice or restriction which may have a diameter of .010 inch. This has a direct reference to the nozzle outlet which is of the order of .028 inch in diameter. Thus when the nozzle 29 is pulled completely away from the cam 31, as by hand operation, it will be obvious that the fluid pressure in the manifold is almost at zero gauge. The use of a restriction in the member 20' therefore has a direct reference to the operation of the nozzle and the cam. The manifold block is formed with a reservoir passageway 22 through it. In communication with the passageway 22 is a lateral passageway 23 which receives one end of an exhaust pipe 24 through which air is conducted to the indicating element of the recording device. At the opposite end of the passageway 22 a flexible U-tube 25 is attached. The free end of the U-tube is connected to a counterbalancing tube 26. This tube is substantially rigid and is mounted to pivot upon a pivot block 27 which is secured to the back wall 28' of a case 28 within which the entire structure is housed. The free end of the counterbalanced tube 26 is bent on a half turn, as indicated at 26', and carries a discharge nozzle 29 at its end. The discharge nozzle 29 has a restricted orifice through which a jet of air under pressure may pass and which jet may impinge the surface 30 of a cam 31. In the drawing the cam surface is indicated as being eccentric to a magnetically responsive head 32 on which said cam is mounted. It is understood, however, that the cam surface may be shaped to conform to any plotted contour and thus determine the performance of the structure as will be hereinafter described. The head 32 is concentric with and extends into a magnetic field produced by a speed cup which is rotatably connected to a rotary member, the speed of rotation of which is to be measured. It is also to be understood that the head 32 tends to be rotated by the magnetic field set up by the rotation of the speed cup, said head having, as is well known in the art, a hair spring which opposes the torque applied thereto by said field so as to limit the rotation of said head in response to said torque to less than a single rotation, and causing the angle through which said head turns in response to said field to be in direct proportion to the speed of said speed cup. The present instrument is designed to operate with the rotary table of a well drilling rig, although it is to be understood that the invention is not thus limited. Mounted upon the counterbalance tube 26 is a clamp 35 which is formed with an end face 36 against which a pin 37 abuts. The pin 37 is formed with a threaded portion 38 and a disc member 39 by which the pin may be rotated. The threaded portion 38 extends into the threaded bore of a collar 39'. The collar 39' is secured at the lower end of a Sylphon bellows 40. The Sylphon bellows 40 is in communication with a bellows connection 41 which has a passageway 42 through it. Oppositely extending feet are formed on the member 41, as indicated at 43, and have longitudinal slots 44 in them to receive screws or bolts 45 by which the structure may be adjusted horizontally with relation to the back 28' of the housing 28. It is to be undertsood that in order to accommodate this adjustment the clamp 35 may be moved longitudinally of the counterbalance tube 26 and may be held in a clamped position by a set screw 35'. The upper end of the passageway 42 in the member 41 is provided with a connection 46 to which a tube 47 is attached. The lower end of the tube 47 connects with the passageway 22 of the manifold block 21 through a lateral passageway 48. An R. P. M. gauge 49 is connected to the manifold block 21. The gauge 49 may indicate the revolutions per minute of the member to which the tachometer is attached but the principal feature of the invention is to amplify the impulse produced by the tachometer pneumatically and to create sufficient pneumatic force to operate the recording device. The recording device of the type used is provided with a stylus arm 50 carrying a stylus 51 which moves across a chart 52. The chart is driven by suitable means with which the present invention is not concerned. The stylus lever is connected with suitable pressure responsive means such as a Bourdon tube so that as the fluid pressure varies in the pipe 24 the stylus arm will swing and will indicate the revolutions per minute. The force with which the stylus arm is moved is limited only by the amount of pressure fluid supplied.

In order to attach the tachometer unit to a desired point on a well rig or the like a clamping bracket 53 is secured to the housing 28, and a clamping bolt 54 acts to hold the entire structure to any suitable element upon a derrick.

In operation of the present invention the tachometer unit is secured in position to a fixed structural element by the clamp 53 and the clamp bolt 54. The supply pipe 10 is then connected with a source of fluid under pressure, such as air. This source may be any pressure from 30 p. s. i. to 200 p. s. i. The air passes through the air filter and then to the pipe 12, after which it passes through the reduction valve 13. This valve is adjusted by suitable means to reduce the eduction pressure to any desired value. The reduced pressure fluid then passes through the pipe 15 to the manifold block 17, and then to the fluid pressure gauge 18. The fluid then flows through the pipe 20 to the main manifold block 21. It then flows through the passageway 22 into the lateral passageways 23 and 48 as well as the connection to the large R. P. M. counter 49. There is unrestricted passage to the flexible U-tube 25 so that the air may flow into the counterbalance tube 26. At approximately the juncture of the flexible tube 25 with the tube 26 a tension spring 55 is connected by one of its ends to tube 26. The opposite end of said spring is attached by a screw 56 to the manifold block 21 so that there is a tendency for the end portion 26' of the counterbalance tube 26 to swing upwardly in the direction of the arrow $a$, as indicated in the drawing. The upward swinging movement is opposed by downward pressure of the pin 37 which acts against the clamp 35. Downward pressure is exerted by the bellows 40 which is connected to the member 41 and the tube 47. It will be understood that air under pressure flows through the tubes 15, 20 and 47 to the passageway 42 and thence into the bellows 40. This air under pressure tends to distend the bellows and force its lower end downwardly. As the air in the bellows changes in pressure the tip of the nozzle 29 will move toward and away from the contour of the cam 31. This tends to correct the action produced by the back pressure in the system, as will be hereinafter described. The electric speed cup which is rotatably connected to a member whose speed of rotation is to be counted, turns in proportion therewith and acts through eddy currents in the rotating magnetic field set up by rotation of said cup to rotate the head 32 and the cam 31 mounted thereon. The tip of the nozzle 29 is adjacent to the cam surface 30 but at no time does it touch the surface. When there is a change in air pressure conditions within the system there is liable to be a time lag in the operation of the device. This time lag is a direct function of the volume of air required to fill the system or to change the pressure. As the cam 31 turns, the space between its nozzle 29 and the cam surface 30 will decrease. This causes the pressure in the counterbalance tube 26 to be increased. This increase may be observed on gauge 49. As the back pressure rises in the tube 26 it also increases in the bellows 40. The bellows 40 has been selected to give a suitable travel for this pressure change. The movement of the bellows thus pushes the nozzle 29 away from the surface 30 of the cam 31 while the cam 31 is being turned toward the nozzle 29. By properly designing the contour of the cam surface 30 and the amount of distension of the bellows 40, these opposing movements result in a small decrease in space. The change in pressure within the tube 26 will also be reflected within the flexible tube 25 and the exhaust pipe 24 leading to the recording structure. When the cam 31 turns in a counter-clockwise direction the space between the nozzle 29 and the cam face 30 increases. At this time the pressure within the system decreases so that the bellows 40 moves upwardly allowing the nozzle 29 to move toward the cam 31 due to the action of the spring 55. It will be evident therefore that the bellows operates at all times to minimize the effect of the cam movement. The result will be that the impulse utilized by the tachometer in rotating the cam 31 will act to vary the fluid pressure in the system and thereby actuate the recording device as well as the visual indicator 49. Attention is directed to the fact that the tachometer unit is adjustably secured in place so that the relation of the rotating R. P. M. unit to that of the rotary table R. P. M. can be adjusted. This speed ratio adjustment enhances the utility of the device and insures that it is not necessary to accurately predetermine the gear ratios in a new installation and this allows the changing of the device from one application to another by a convenient adjustment action.

Summarizing the above description, it may first be noted that the primary purpose of the disclosed embodiment of the invention is to produce a continuous graphic record of the R. P. M. of a rotating member, such as a rotary table, at a station remote therefrom. In the system described the actuation of a graphic recorder at said station is effected by fluctuations in air pressure in the line 24 leading from the air reservoir manifold 21, the pressure of air in which varies in inverse proportion to the distance between the tip of nozzle 29 and the surface 30 of the cam 31. As a very slight change in this distance results in a rather marked fluctuation in the air pressure in manifold 21, the total range in the distances between the nozzle 29 and surface 30, therefore, which can be used for controlling the air pressure in manifold 21, and thus in the graphic recorder 52, is limited to a few thousandths of an inch.

The reason for employing the bellows 40, as above described, is that it is impractical to machine the cam 31 with such precision that the nozzle 29 could be fixed, and the variations in radius of the surface 30 of cam 31 could be limited to just those amounts necessary to produce the desired change in the distance between the nozzle 29 and the surface 30, with each given angular rotation of cam 31, to produce a corresponding change in air pressure in the manifold 21 and graphic recorder 52. Cam 31 is therefore machined with an exaggerated rate of radius change, as shown in Fig. 2 and the bellows 40 is provided to compensate for this exaggeration and yet cause the distance between the nozzle 29 and the cam surface 30 (with the cam in various rotated positions) to vary directly as the R. P. M. of the tachometer speed cup which caused said cam to be rotated to said positions, and at the same time keep the maximum spacing of the nozzle 29 from the cam surface 30 within the limit within which the nozzle-cam spacing is effective in producing an air pressure which is proportional to the change in angular position of the tachometer head 32.

To secure these ends, the bellows 40 is selected with a given rate of expansion in response to air pressure and this is then adjustably mounted as above described so that the force of this bellows may be applied to the nozzle arm 26 at a selected distance from the fulcrum axis of this arm in the pivot block 27. The adjustment of the bellows is of course accomplished by shifting the bracket 43 horizontally on the backwall 28' and also shifting the clamp 35 on the nozzle arm 26. By this adjustment a variation is produced in the distance which the nozzle 29 will be shifted towards or away from the cam surface 30 as a result of a decrease or increase of air pressure in the bellows which was occasioned in turn by the cam surface 30 moving away from or towards the nozzle 29.

An adjustment of the screw 38 in the collar 39' produces an increase or decrease in all of the distances which the nozzle 29 is spaced from the cam surface 30 with the cam in its various rotational positions. The expansion of the bellows 40 being in direct proportion to the pressure of air delivered thereto, the bellows causes the nozzle 29 to be closer to a high point on the cam surface 30 than it causes said nozzle to be spaced from a low point on said cam surface. This results from the spring rate of the bellows with which it resists extension and which requires that the nozzle must be closer to the cam surface 30 to build up a sufficient pressure in the bellows 40 to extend this to maintain the nozzle 29 out of contact with the surface 30 when a high point on the latter is opposite said nozzle, than is necessary to keep the nozzle out of contact with the cam surface 30 when a low point in the cam surface is opposite said nozzle.

The bellows 40 is selected to have such a degree of responsiveness to the regulated pressure of air supplied to manifold 21, that as the cam surface 30 approaches close to the nozzle 29 this will always build up enough pressure in the bellows to sufficiently retract the nozzle 29 so as to prevent the cam actually contacting the nozzle. When a high point on the cam is opposite the nozzle, this distance will of course be very small but the bellows 40 will be so selected and will be so positionally adjusted with relation to the fulcrum axis of the nozzle arm 26 that it will never let the nozzle remain in a position where it will be contacted by the cam surface 30. Thus the tachometer head 32 will always be completely free of any retarding force other than the hair spring connected thereto and thus will always assume a rotational position in direct proportion to the rotational speed of the member to which the tachometer speed cup is rotationally connected.

It will thus be seen that the electro-pneumatic tachometer here shown and the method of operating the same is simple and effective to cause the relatively feeble electrical impulse created by the rotation of a member whose speed of rotation is to be measured to be increased in direct relation to said impulse, and thereby produce a strong moving force by which useful work may be accomplished, particularly in actuating the recording device.

While I have shown the preferred apparatus and method of carrying out the invention, it is to be understood that various changes may be made in the combination, construction and arrangement of the parts of the apparatus and in the steps of the method by those skilled in the art, without departing from the spirit of the invention as claimed.

Having thus described my invention, what I claim and desire to secure by Letters Patent is:

In an apparatus for relaying a control function through compressed air, the combination of: a rotary member subject to rotational changes in position, said member having a cam face thereon the altitude of which, opposite a given point, varies uniformly with said changes in position; a tubular nozzle arm having a nozzle on the end thereof disposed at right angles to said arm; means for pivotally mounting said arm to permit said nozzle to swing about said mounting to bring said nozzle into closely spaced relation with said cam face at said point; spring means applied to said arm to resiliently bias said nozzle toward said cam face; a bellows; means for mounting said bellows on an axis substantially at right angles to said arm, yet permitting adjustment of said bellows in a direction parallel with said arm; an impact block mounted on said arm and adjustable lengthwise thereon; adjustable means provided on the free end of said bellows and positioned to engage said impact block to place said bellows in opposition to the bias imposed on said arm by said spring means, said adjustable means being adapted to vary the distance from said bellows to the point at which said means engages said block; manifold means for enclosing a body of air and placing said body of air simultaneously in communication with said tubular nozzle arm and said bellows; and means for supplying air to said body of air at a substantially uniform rate which is less than the maximum capacity of said nozzle to discharge air from said body.

JUD E. WHITE.

References Cited in the file of this patent

UNITED STATES PATENTS

| Number | Name | Date |
|---|---|---|
| 1,954,514 | Beck | Apr. 10, 1934 |
| 2,073,152 | Helgeby | Mar. 9, 1937 |
| 2,240,243 | Mason | Apr. 29, 1941 |
| 2,388,457 | Ziegler | Nov. 6, 1945 |
| 2,443,891 | Buerschaper | June 22, 1948 |
| 2,455,917 | Crake | Dec. 14, 1948 |
| 2,461,026 | Bilyeu | Feb. 8, 1949 |

FOREIGN PATENTS

| Number | Country | Date |
|---|---|---|
| 390,550 | Germany | Mar. 1 1923 |